G. ENGELBREKT.
TURBINE MOTOR FOR USE WITH COMPRESSED AIR.
APPLICATION FILED OCT. 4, 1917.
1,268,945.
Patented June 11, 1918.
3 SHEETS—SHEET 1.
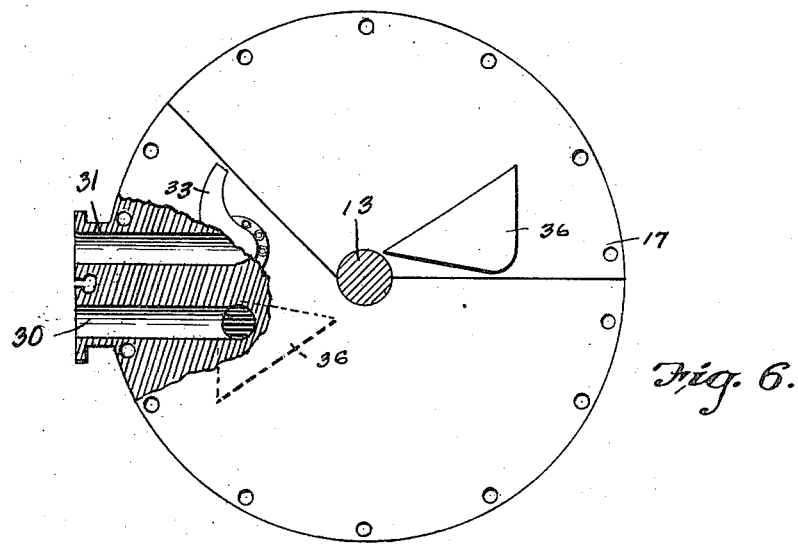
Fig. 6.
Fig. 1.
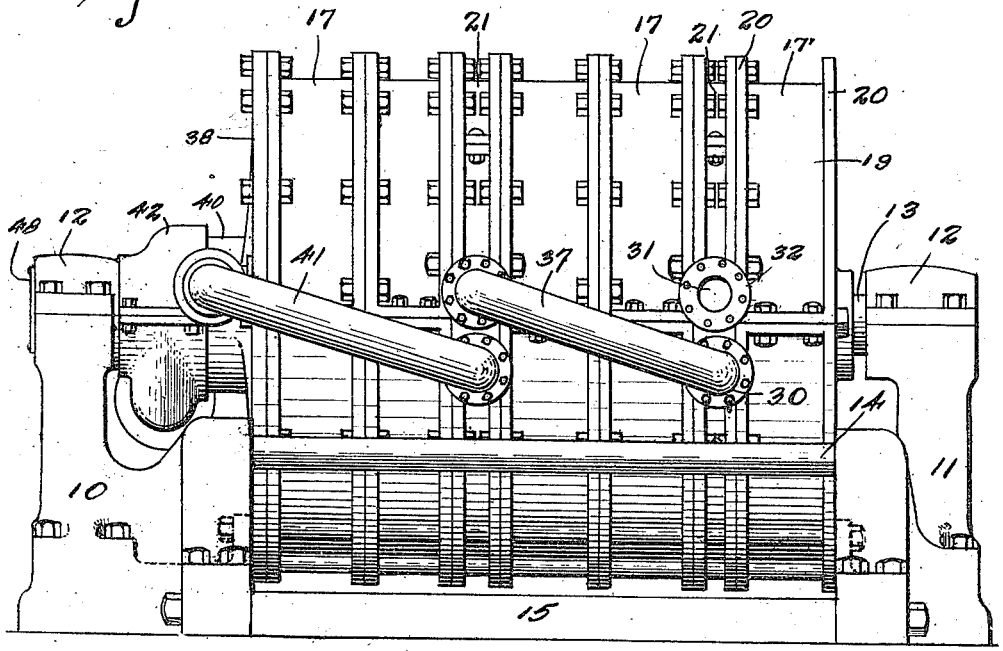
Inventor
Gustaf Engelbrekt,
By H. L. Woodward
Attorney

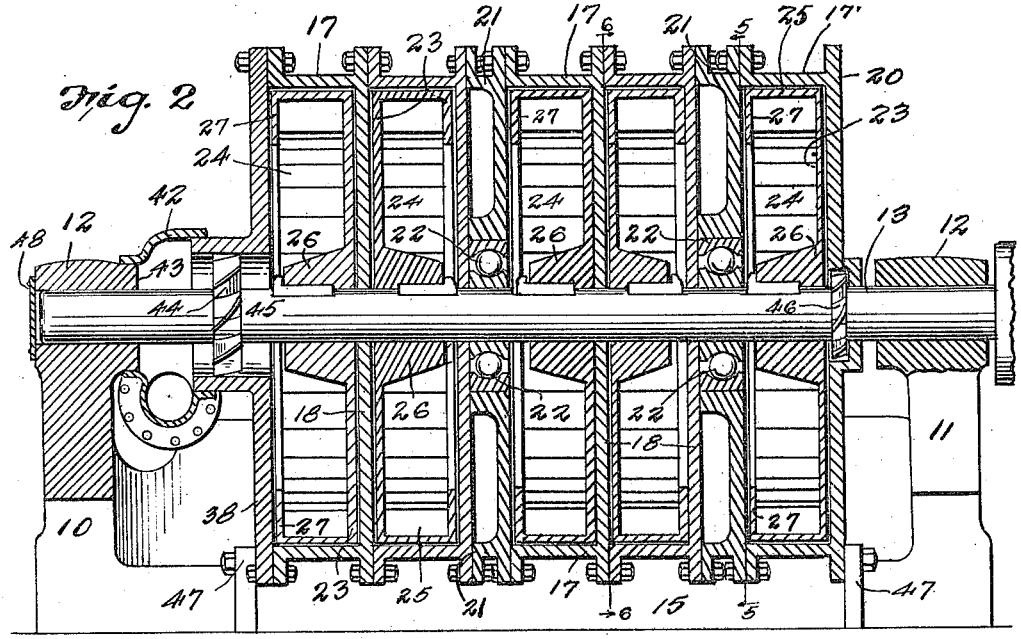
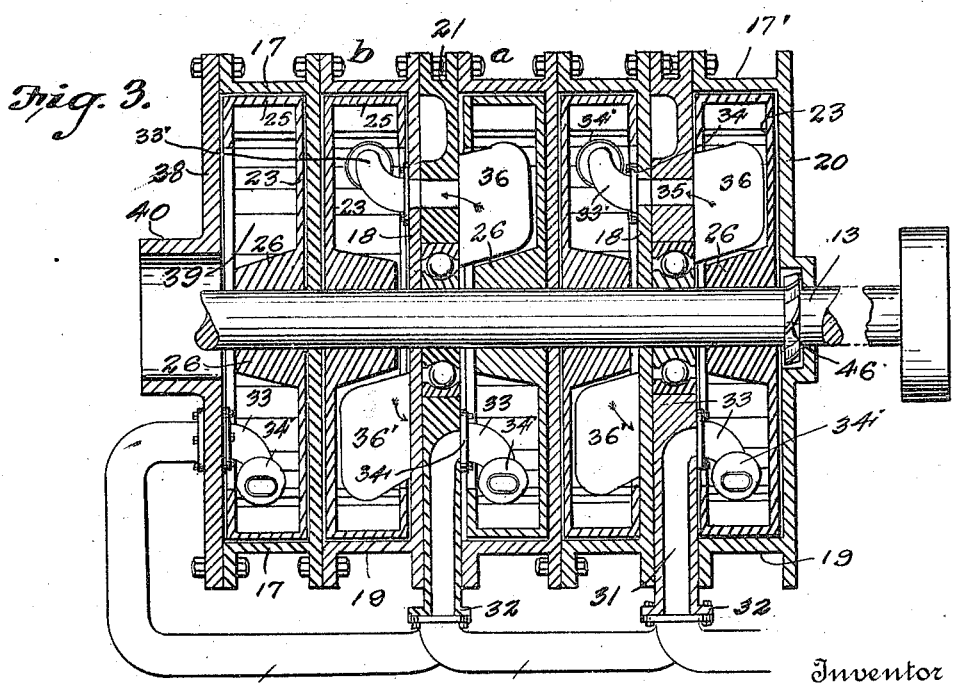

G. ENGELBREKT.
TURBINE MOTOR FOR USE WITH COMPRESSED AIR.
APPLICATION FILED OCT. 4, 1917.

1,268,945.

Patented June 11, 1918.
3 SHEETS—SHEET 3.

Inventor
Gustaf Engelbrekt,
By H L Woodward
Attorney

UNITED STATES PATENT OFFICE.

GUSTAF ENGELBREKT, OF SUPERIOR, WISCONSIN.

TURBINE-MOTOR FOR USE WITH COMPRESSED AIR.

1,268,945.

Specification of Letters Patent. Patented June 11, 1918.

Application filed October 4, 1917. Serial No. 194,772.

*To all whom it may concern:*

Be it known that I, GUSTAF ENGELBREKT, a citizen of the United States, residing at Superior, in the county of Douglas and State of Wisconsin, have invented certain new and useful Improvements in Turbine-Motors for Use with Compressed Air, of which the following is a specification.

The invention has for an object to effect improvements in turbine constructions, especially aiming to provide an efficient motor of this character for use with hot air under pressure. It is an object to enable the repeated application of force of the air, in an efficient manner and also to give a construction whereby the loss of efficiency through back pressure will be minimized and counter-acted.

Another important aim of the invention is to provide an efficient construction in the rotor units and their correlation to each other, and the air conduits, whereby a maximum efficiency may be realized, and the length of conduits required greatly reduced.

It is also an important aim to give a construction in such turbines enabling the parts to be produced readily, and assembled with a minimum expense for labor and fitting, enabling parts to be made readily interchangeable and enabling successive units to be assembled in the turbine without requiring large variations in design of parts.

Figure 5:
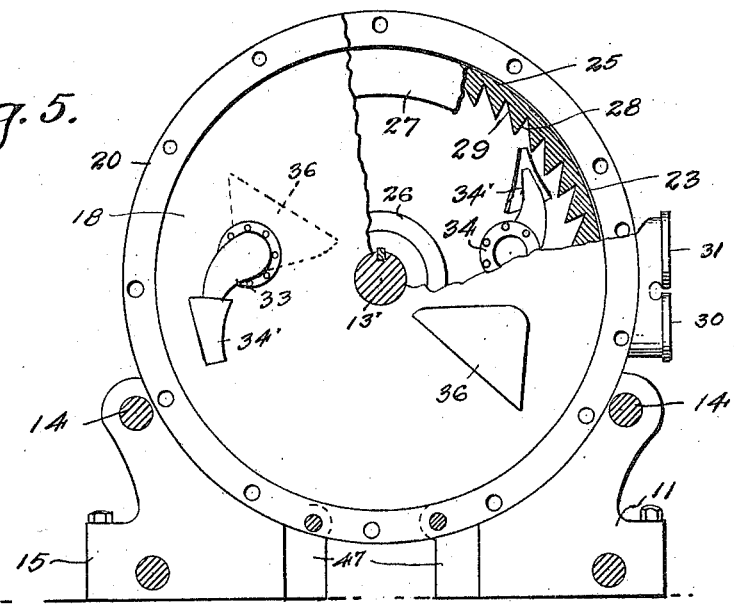
Figure 4:
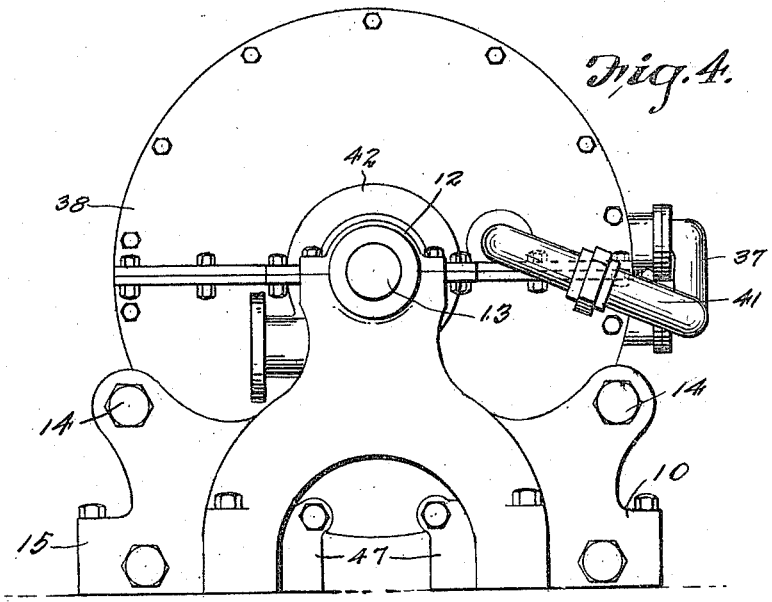

Additional objects, advantages and features of invention reside in the combination and arrangement of the parts, and in the construction thereof, as hereinafter described, and shown in the drawings, wherein, Figure 1 is an elevational view of a turbine constructed in accordance with my invention, Fig. 2 is a longitudinal vertical sectional view thereof, Fig. 3 is a longitudinal horizontal section thereof, Fig. 4 is an end elevation of the device, Fig. 5 is a cross section on the line 5—5 of Fig. 2, with parts broken away, Fig. 6 is a similar view looking in the opposite direction, on the line 6—6, of Fig. 2.

There is illustrated a turbine comprising a base frame including end portions 10 and 11, each having bearings 12 thereon in which is journaled the main shaft 13 of the turbine. At each side, heavy supporting shafts 14 are extended between the sections 10 and 11, for the support of cylindrical casing elements to be subsequently described, while a heavy base piece 15 is extended between the sections 10 and 11 which are securely bolted against the ends thereof. Supported between the end sections 10 and 11 there is a plurality of cylindrical casing sections 17 and 17', all except the latter of identical construction, each including two half sections comprising a back wall section 18, a semi-cylindrical wall 19, and suitable flanges 20 at opposite sides and edges, whereby the half sections may be bolted together, and like casing sections bolted together or upon nozzle plates to be subsequently described. In each of the sections mentioned, there is thus provided a circular chamber around the shaft 13, the respective sections being suitably fitted around the shaft for free rotation of the latter. In the present instance, five such sections are shown, and between the first and second and third and fourth sections, from the right as viewed in Fig. 1 there are interposed nozzle carrying spacing plates 21, also formed in two sections, having a diameter corresponding to that of the casing sections 17, and suitably flanged to be secured together and secured to the casing sections 17 and 17'. The plates 21 are fitted with suitable bearings in which the shaft 13 is journaled, in the present instance ball bearings 22 being indicated. Splined upon the shaft 13 within each of the sections 17 and 17', there are rotors 23. The rotors include each an annular series of vanes 24 with a cylindrical inclosing portion 25 carried upon a circular web portion, having central hubs 26 secured upon the shaft 13. The vanes have also a partly inclosing flange portion 27, parallel to the web portion, joined to the cylindrical portion 25, and between the flange 27 and web the vanes extend parallel to the shaft 13. The vanes have each two faces, one 28 extending nearly or quite radially with respect to the axis of the shaft, while the other 29 extends at an angle thereto most suitable for giving the proper form to the space between the vanes and also minimizing resistance, the last mentioned face extending from the base of one of the faces 28 to the outer end of the next adjacent vane.

The flange 27 extends inwardly toward the axis of the shaft a slight distance beyond the vanes, so as to form a suitable retaining means whereby air passing from jets or nozzles in the device will be suitably focused upon the vanes and its full efficiency attained.

It will thus be seen that each rotor has an open side and a closed side, and it will be noted that the first and second rotors, noting from the right in Fig. 2, have their open sides presented toward each other, as do the third and fourth rotors, while the last rotor at the left in said figure has its open side disposed toward the end of the complete device. these arrangements having peculiar advantages as will subsequently appear.

Each of the plates 21 is provided at one side with outlet and inlet passages 30 and 31, respectively, opening at the edges of the plate and provided with suitable flange terminals 32 whereby proper pipe connections may be made for conduct of air to and from the plates, as will be subsequently described. The passages are located one above the other, and are extended approximately horizontally, as shown in Fig. 6, although this is not essential. The inlet passage 31 opens upon one side of the plate, while the outlet passage opens upon the other. At the inner end of the inlet passage 31, which it will be noted is located a short distance inwardly of the adjacent flange 27 of the rotor toward the right, a nozzle 33 is fitted, having a suitable annular base plate 34 bolted upon the face of the plate 21 within the annular chamber thereadjacent, and within the rotor. The nozzle is curved and shaped so as to direct the air upwardly and into the large end of an injector hood 34', the opposite end of which is tapered to a suitably reduced orifice, and shaped and directed so that air projected and drawn therethrough will be directed into the spaces between the vanes 24, and against the vanes themselves at such an angle as will be most efficient for inducing rotation of the rotor. Formed through the plate 21 at the opposite side of its axis from the nozzle 33, there is a passage 35, and mounted upon the plate 21 on the same side with the nozzle 33 there is a hood or funnel element 36, opening upwardly in the same general direction as the nozzle 33, suitably shaped to catch and focus air passing downwardly after leaving the nozzle 33 and moving a distance circularly within the casing, so that the air will pass through the passage 35. The adjacent wall 18 of the next casing section 17 to the left is formed with an opening registering with the passage 35, and a nozzle 33' is fitted over this opening, and directed downwardly, this nozzle being also fitted with a hood 34' similar to the hood 34' first mentioned. The vanes in the adjacent rotor are suitably arranged to develop power from the impact and pressure of the air admitted from the first casing section through the nozzle 33', as will be understood. At the opposite side of the last mentioned casing section 17, a hood 36' is provided, corresponding to the one 36 before mentioned, but inverted so as to direct air engaged thereby through a suitable opening 37 in the casing section, this opening being located in registry with the terminal inner end of the passage 30 in the plate 31. The next two sections of the turbine, a, and b, include casing elements 17, rotors, nozzles and hoods, with an interposed plate 21 constructed and arranged in the identically same manner as described for the first two sections. From the outer end of the passage 30 in the first plate 21, a duct 37 is extended to the intake passage 31 of the next plate 21, as shown in Fig. 3. In the last casing element 17 of the casing, the rotor is disposed in the same relation as in the first section, as before mentioned, so that its open side is disposed toward the open side of the section 17. An end plate 38 is provided for closing the last section of the casing, this plate having an enlarged central opening 39 therethrough continued by a tubular longitudinal extension 40 concentric with the shaft 13. This plate is provided with a nozzle 33, alined with the first mentioned nozzle 33, and similarly directed, an opening being formed through the plate 38 for communication with the nozzle, and a suitable pipe 41 being led from the outlet 30 of the adjacent plate 21 to this opening, so that air leaving the next to the last casing section will be directed against the last rotor in the turbine in a manner to develop further power. From this last section of the casing, the motive fluid is permitted to escape through the opening 39 and tubular extension 40 into a hood element 42 mounted over the end of the extension 40 and upon the adjacent bearing 12, so as to completely inclose the space therebetween and direct air exhausted by the turbine for conduct to a point of disposal or treatment. The adjacent bearing 12 is formed with a suitable cylindrical portion 43, whereby the hood 42 may be readily fitted thereon, the hood being made in two sections adapted to be bolted together above and below the shaft 13.

Within the tubular extension 40 of the end plate 38, fan blades 44 are mounted upon the shaft 13, having such form and arrangement as to tend to propel air or other fluid outwardly from the turbine into the hood 42, a series of stationary blades 45 being mounted or formed upon the plate 38, extending in radial plane with respect to the shaft 13. At the inlet end of the turbine, any suitable means may be provided around the shaft 13 to prevent escape of air from the casing, and in the present instance, small fan blades 46 are shown, mounted upon the shaft 13 and having such form and direction as to tend to press inwardly any air encountered thereby. At each end, the frame elements 10 and 11 are provided with suitable flange portions 47 secured to the casing in such manner as to counteract the torque.

In order to prevent escape of air through the bearing at the exhaust end of the turbine, a plate 48 is secured over the end of the bearing, completely inclosing the space before the adjacent end of the shaft.

In use, air under high pressure is admitted to the turbine, being heated before admission, to a degree calculated to produce the maximum efficiency of expansion therein within the limitations of engineering requirements, this air first passing through the nozzle 33 at the right hand end of the machine as shown in Figs. 2 and 3 and exerting its force upwardly upon the near side of the first rotor. After passing partly around the casing, it is engaged by the funnel 36, and directed through the passage 35 to the nozzle 33' in the next casing section, where it exerts its effect downwardly upon the adjacent rotor, and is again engaged within a hood at 36', and led outwardly through the pipe 37 to the next adjacent rotor, by which it is focused by the nozzle 33 upwardly, as in the first instance. From this point the air passes partly around the casing and downwardly through the funnel 36, whence it is led to the next to the last section, wherein it is directed downwardly by the nozzle 33', passing thence around the lower part of the chamber to the hood 36' at the opposite side, by which it is collected and passed through the pipe 41 into the last section of the turbine, being there focused by the nozzle 33 as before, directed upwardly. After exerting its effect here, the air passes toward the center of the turbine and is drawn outwardly by the fan blades 44 mounted upon the shaft 13, being also aided by the difference in pressure within the cylinder and the exhaust conduit connected with the hood 42 by which the exhaust air is collected and directed into the conduit.

By the successive utilization of the force of impact and expansive effect of the air, a very high efficiency is attained for the power expended in compressing and heating the air.

This turbine is especially designed and adapted for use in connection with the system described and claimed in another application, wherein, after exhaust from the turbine, the air is cooled to a low temperature, and passed back to the compressor device by which it is supplied to the turbine, this having the effect of producing a partial vacuous condition in the exhaust passages calculated to remove a large part of the back pressure, which might otherwise occur in such systems. By reason of the large size of exhaust passage within the tubular extension 40 of the end plate of the turbine, the fan 44 may be made large enough to have a high efficiency in ejecting air from the turbine.

What is claimed:

1. In a turbine of the character described, the combination of a plurality of cylindrical casing sections coaxially arranged and having dividing portions therebetween, rotors revoluble in respective casing sections arranged in pairs having adjacent open sides and opposite closed sides, nozzles carried by the dividing portions between the rotors of each pair and directed in opposite directions thereagainst, means to admit expansive fluid to one of the nozzles from an exterior source, communication being formed through said dividing portion to the other of said nozzles, an exhaust passage being formed from the casing section opposite the last named nozzle.

2. A turbine of the character described comprising a coaxial series of cylindrical casing sections, respective rotor elements revoluble therein, a common shaft splined in the rotors said rotors being paired and including an end rotor, the rotors in each pair having mutually adjacent open sides and outer closed sides, an annular series of vanes constructed thereon immediately adjacent the periphery and directed inwardly, the faces between the vanes being closed at the outer side immediately adjacent the peripheries of the rotors, an annular flange being formed on each rotor at the open side concentric with the shaft and parallel to the closed portion of the rotor, and extending a distance inwardly of the vanes, nozzle elements carried by the casing elements within the rotors, the nozzles in each pair being directed oppositely to each other, means to admit expansive fluid to one of the nozzles from the exterior, connections between the interior of alternate rotors and the nozzles of the next, in series throughout the turbine, as for the purposes described, alternate casing sections having exterior exhaust ports and connections between said exhaust ports and the nozzles in the second casing sections following in series.

3. In a rotor of the character described, a cylindrical casing, a concentric revoluble shaft mounted therein, a rotor splined upon the shaft, including vane elements, means to direct an expansive fluid against the rotor, said casing having an enlarged concentric outlet opening, and a multiplicity of fan blades upon said shaft within the opening having a form and arrangement for propelling air from the casing under operative rotation.

In testimony whereof I have affixed my signature.

GUSTAF ENGELBREKT.